United States Patent [19]

Mansmann et al.

[11] Patent Number: 4,649,326

[45] Date of Patent: Mar. 10, 1987

[54] HIGH VOLTAGE MOS SCR AND POWER MOSFET "H" SWITCH CIRCUIT FOR A DC MOTOR

[75] Inventors: Jeffrey G. Mansmann; Philip W. McEntarfer, both of Chandler, Ariz.

[73] Assignee: Motorola Inc., Schaumburg, Ill.

[21] Appl. No.: 880,253

[22] Filed: Jun. 30, 1986

[51] Int. Cl.[4] .............................................. H02P 1/22
[52] U.S. Cl. .................................... 318/293; 318/287; 318/291; 318/294; 318/345 G
[58] Field of Search .............. 318/280, 287, 289, 291, 318/293, 294, 345 G; 307/254, 255, 262, 571; 363/17, 98, 128

[56] References Cited

U.S. PATENT DOCUMENTS 4,454,454 6/1984 Valentine .............................. 318/293
4,575,662 3/1986 Lehnhoff .............................. 318/293

Primary Examiner—William M. Shoop, Jr.
Assistant Examiner—Bentsu Ro
Attorney, Agent, or Firm—Dale E. Jepsen

[57] ABSTRACT

An MOS SCR and MOSFET "H" switch circuit for a DC motor is provided which allows for the use of a supply voltage of greater than 20 volts by clamping the gate-to-cathode voltage of the SCR's used therein to a predetermined value which is less than the gate-to-cathode breakdown voltage of said SCR's.

8 Claims, 4 Drawing Figures

− PRIOR ART −

− PRIOR ART −

HIGH VOLTAGE MOS SCR AND POWER MOSFET "H" SWITCH CIRCUIT FOR A DC MOTOR

BACKGROUND OF THE INVENTION

The present invention relates in general to the field of DC motor control circuits. More particularly the present invention relates to an improved "H" switch circuit utilizing MOS SCR's and power MOSFETS for providing bidirectional control of DC motors, wherein a low voltage drive or control signal may be used to connect a relatively high voltage to the DC motor.

Previously there has been described an "H" switch circuit for use in reversing the motor supply voltage for bidirectional control of a DC motor. Opposing top and bottom switches coupling the DC motor input leads to a voltage source and circuit ground control the motor direction by switching voltage polarity, which in turn switches the motor's shaft rotation either clockwise or counter-clockwise. Heretofore these "H" switch circuits utilized either bipolar devices, Darlington transistors, or more recently power MOSFETS for the actual switching devices. For example, U.S. Pat. No. 4,454,454 issued to Richard J. Valentine describes an "H" switch circuit utilizing power MOSFETS for the individual switches. A recent improvement provides for the use of a MOS SCR in place of the power MOSFET for the high side switch in such a circuit. While this improved "H" circuit provides certain advantages there is an inherent limitation to the amplitude of the supply voltage which may be used in conjunction therewith due to the gate-to-cathode breakdown voltage of the MOS SCR.

SUMMARY OF THE INVENTION

It is therefore an object of the present invention to provide an improved MOS SCR and MOSFET "H" switch circuit for a DC motor.

It is further an object of the present invention to provide an improved MOS SCR and MOSFET "H" switch circuit for a DC motor which allows a relatively high voltage to be applied to the DC motor.

It is still further an object of the present invention to provide an improved MOS SCR and MOSFET "H" switch circuit for applying a relatively high voltage to a DC motor utilizing input or control signals of a relatively low voltage.

The foregoing and other objects are achieved in the present invention wherein there is provided an improved "H" switch circuit for applying a relatively high voltage to a DC motor. The "H" switch circuit comprises first and second SCR's having anode, cathode and gate terminals, the anode terminals of which are coupled together for connection to a source of supply voltage. In addition there are first and second MOSFETs having source, drain and gate terminals, the source terminals of which are connected together for coupling to a common voltage line. The drain terminal of the second MOSFET is coupled to the cathode terminal of the first SCR for coupling to a first input terminal of the DC motor. The drain terminal of the first MOSFET is coupled to the cathode terminal of the second SCR for coupling to a second input terminal of the DC motor. The gate terminal of the first MOSFET is coupled to the anode terminal of a first diode for connection to a first control terminal. The cathode terminal of the first diode is coupled to the gate terminal of the first SCR, to the cathode terminal of a second diode and to the first terminal of a first resistor, the other terminal of which is coupled to the common voltage line. The anode terminal of the second diode is coupled to the anode terminal of a first zener diode, the cathode of which is coupled to the first input terminal of the DC motor. The gate terminal of the second MOSFET is coupled to the anode terminal of a third diode for coupling to a second control terminal. The cathode terminal of the third diode is coupled to the cathode terminal of a fourth diode, to the gate terminal of the second SCR and to the first terminal of a second resistor, the other terminal of which is coupled to the common voltage line. The anode terminal of the fourth diode is coupled to the anode terminal of a second zener diode, the cathode terminal of which is coupled to the second input terminal of the DC motor. In operation control signals are applied between the first control terminal and the common voltage line or between the second control terminal and the common voltage line to cause motor rotation in the desired direction.

BRIEF DESCRIPTION OF THE DRAWINGS

The above and other features and objects of the invention and the manner of obtaining them will become more apparent and the invention itself will be best understood by reference to the following description of an embodiment of the invention taken in conjunction with the accompanied drawings wherein.

DESCRIPTION OF A PREFERRED EMBODIMENT

Figure 1:
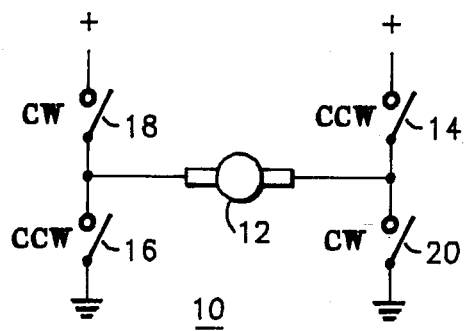
FIG. 1 illustrates a simplified conceptual representation of an "H" switch circuit for providing bidirectional control to a DC motor.

With reference to FIG. 1 a conceptual representation of an "H" switch circuit 10 is shown. "H" switch circuit 10 is useful for providing bidirectional control to DC motor 12. When switched in consonance, CW switches 18 and 20 provide voltage of a given polarity to DC motor 12 by coupling the leads thereof to a source of positive DC voltage and circuit ground. Likewise CCW switches 14 and 16, when switched in consonance can change the direction of rotation of DC motor 12 by reversing the polarity of the voltage applied to the input leads of DC motor 12.

Figure 2:
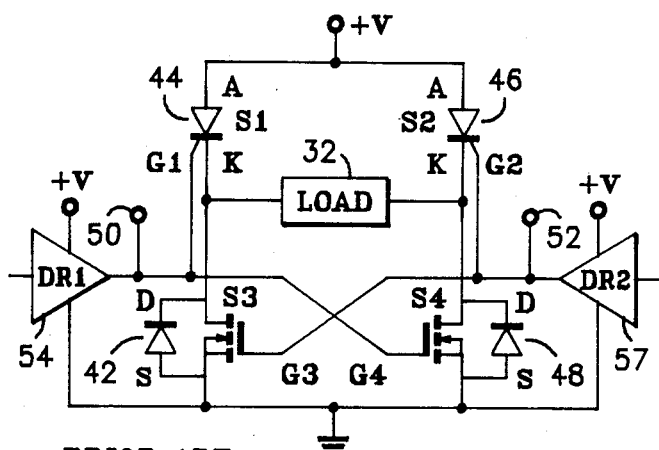
FIG. 2 illustrates an MOS SCR and MOSFET "H" switch circuit wherein the supply voltage being applied to the load and the control signals are approximately the same voltage.

Referring now to FIG. 2 there is shown an MOS SCR and MOSFET "H" switch circuit wherein MOS SCR 44 and MOSFET 48 correspond to CW switches 18 and 20 of FIG. 1 respectively and MOS SCR 46 and MOSFET 42 correspond to CCW switches 14 and 16 of FIG. 1 respectively.

While there are various significant benefits to be obtained by using a MOS SCR between the supply voltage and the load and a MOSFET between the load and ground there is a significant problem when an MOS SCR is used on the high side of the "H" circuit as shown. For a given motor direction a ground reference signal would be applied to terminal 52 thereby shutting off SCR 46 and MOSFET 42. A control signal approximately equal to the supply voltage would be applied to terminal 50 turning on MOSFET 48. MOSFET 48 would have a very low impedance with respect to SCR 44 which would make the cathode of SCR 44 move towards ground reference. As the gate to cathode voltage of SCR 44 becomes larger than the latch threshold it latches on. The current and voltage to the load would then begin to rise reaching a steady state point at which the cathode voltage of SCR 44 would be equal to the supply voltage minus the on voltage, anode-to-cathode, of SCR 44 (V-$V_{ak}$ on).

For those circuits where the supply voltage is on the order of 15 volts and approximately equal to the control voltage being applied to terminal 50 the maximum voltage which could appear across the gate to cathode junction of SCR 44 is approximately V-$V_{ak}$ (on) or slightly less than 15 volts. This would occur when the control voltage applied to terminal 50 is reduced to ground and an inductive load is being used. At the instant terminal 50 is connected ground, the gate of SCR 44 would be at ground potential and the cathode would be at a voltage slightly less than 15 volts. However, as the supply voltage is increased there is a point at which the voltage from gate to cathode reaches a dangerous reverse bias level at which the gate to cathode junction of the SCR will breakdown. For example, if the gate to cathode breakdown voltage is approximately 20 volts, a dangerous breakdown condition can occur for any supply voltage exceeding approximately 20 plus the on voltage from anode to cathode of SCR 44, or approximately 20.5 volts.

Figure 3:
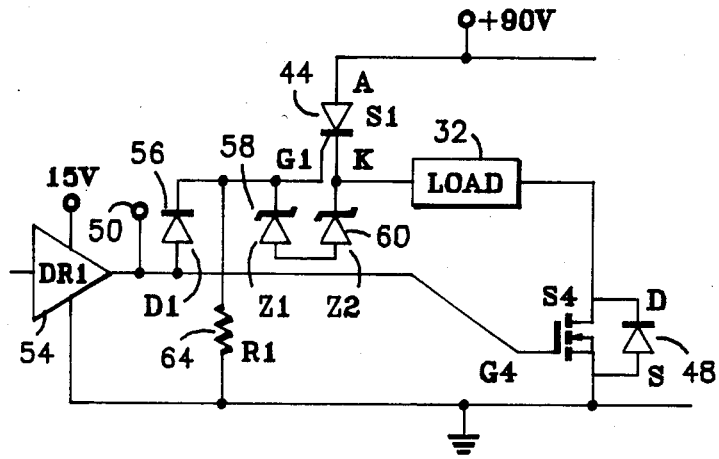
FIG. 3 illustrates a portion of the improved MOS SCR and MOSFET "H" switch circuit in accordance with the present invention.

Referring now to FIG. 3 there is shown a portion of the SCR and MOSFET "H" switch circuit of the present invention. The circuit is shown with only those elements which would be active during motor rotation in a given direction. As before, a relatively low control voltage signal of approximately 15 volts would be applied at terminal 50 thereby switching on MOSFET 48 and forward biasing diode 56 to turn on SCR 44. As current begins to flow and the load voltage plus the drain to source voltage of MOSFET 48 exceeds the input voltage at terminal 50, minus the forward drop of diode 56, by more than the zener voltage of diode 60 plus the forward voltage drop across diode 58, the gate to cathode voltage across SCR 44 will clamp to a voltage equal to the zener voltage of diode 60 plus the forward diode drop of diode 58. Diode 56 prevents any remaining voltage from appearing at terminal 50 and resistor 64 provides a DC path to ground for any excess current.

At steady state, for the supply voltage of 90 volts as shown, the voltage at the cathode of SCR 44 would be approximately 90 volts minus the anode-to-cathode drop of SCR 44 or approximately 89.5 volts, and the voltage at the gate of SCR 44 would be approximately 74 volts assuming the zener voltage of diode 60 to be about approximately 15 volts and the forward drop across diode 58 to be approximately 0.5 volts. The criteria for selecting the value of resistor 64 would include the required power dissipation at operational levels and the effect the value of this resistor would have on the SCR static dv/dt sensitivity.

Figure 4:
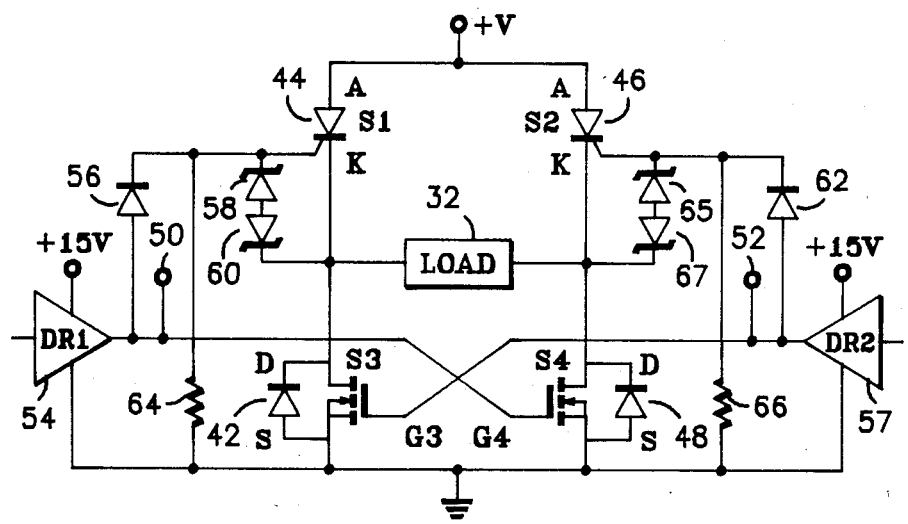
FIG. 4 illustrates a complete MOS SCR and MOSFET "H" switch circuit in accordance with the present invention.

Referring now to FIG. 4 there is shown the SCR and MOSFET "H" switch circuit of the present invention including the gate clamp circuits associated with both SCR's 44 and 46. The anode terminals of SCR's 44 and 46 are coupled together for connection to a first source of supply voltage. The cathode terminal SCR 44 is coupled to the drain terminal of MOSFET 42 for connection to a first input terminal of load 32. The cathode terminal of SCR 46 is coupled to the drain terminal of MOSFET 48 for connection to a second input terminal of load 32. The gate terminal of SCR 44 is coupled to the cathode terminal of diode 56, the cathode terminal of zener diode 58, and to a first terminal of resistor 64. The gate terminal of SCR 46 is coupled to the cathode terminal of zener diode 65, the cathode terminal of diode 62 and to a first terminal of resistor 66. The anode terminal of zener diode 58 is coupled to the anode terminal of zener diode 60, the cathode terminal of which is coupled to the first input terminal of load 32. The anode terminal of zener diode 65 is coupled to the anode terminal of zener diode 67, the cathode terminal of which is coupled to the second input terminal of load 32. The source terminal of MOSFET 42 is coupled to the source terminal of MOSFET 48, a second terminal of resistor 64 and the second terminal of resistor 66 for connection to a voltage reference terminal. The anode terminal of diode 56 is coupled to the gate terminal of MOSFET 48 for coupling to a first control terminal 50. The anode terminal of diode 62 is coupled to the gate terminal of MOSFET 42 for coupling to a second control terminal 52.

What has been provided therefore is an improved MOS SCR and MOSFET "H" circuit which can be used with supply voltages in excess of the breakdown voltage of the MOS SCR. The above description is given by way of example only. Changes in form and detail may be made by one skilled in the art without departing from scope of the invention as described by the appended claims.

We claim:

1. In a SCR and MOSFET "H" switch circuit having:

a first SCR having first anode and cathode terminals and a gate terminal, said first anode terminal connected to a supply voltage terminal for coupling to a source of supply voltage, said first cathode terminal for coupling to a first input terminal of a DC motor and said gate terminal of said first SCR for coupling to a first control terminal;

a second SCR having second anode and cathode terminals and a gate terminal, said second anode terminal connected to said first anode terminal, said second cathode terminal for coupling to a second input terminal of said DC motor and said gate terminal of said second SCR for coupling to a second control terminal;

a first MOSFET having first drain and source terminals and a gate terminal, said first source terminal for coupling to a common voltage line, said first drain terminal connected to said second cathode terminal, and said gate terminal of said first MOSFET connected to said first control terminal; and a second MOSFET having second source and drain terminals and a gate terminal, said second source terminal connected to said first source terminal, said second drain terminal connected to said first cathode terminal, and said gate terminal of said second MOSFET connected to said second control terminal;

the improvement comprising:

a first diode having cathode and anode terminals, said anode terminal of said first diode connected to said first control terminal;

a second diode having cathode and anode terminals, said cathode terminal of said second diode connected to said cathode terminal of said first diode and also connected to said gate terminal of said first SCR;

a first zener diode having cathode and anode terminals, said anode terminal of said first zener diode connected to said anode terminal of said second diode and said cathode terminal of said first zener diode connected to said first input terminal of said DC motor;

a third diode having cathode and anode terminals, said anode terminal of said third diode connected to said second control terminal;

a fourth diode having cathode and anode terminals, said cathode terminal of said fourth diode connected to said cathode terminal of said third diode and also connected to said gate terminal of said second SCR;

a second zener diode having cathode and anode terminals, said anode terminal of said second zener diode connected to said anode terminal of said fourth diode and said cathode terminal of said second zener diode connected to said second input terminal of said DC motor;

a first resistor connected from said gate terminal of said first SCR to said common voltage line; and a second resistor connected from said gate temminal of said second SCR to said common voltage line.

2. The circuit of claim 1 wherein said second and fourth diodes are zener diodes.

3. The circuit of claim 1 wherein said first and second SCR's are MOS SCR's.

4. The circuit of claim 1 wherein said first and second MOSFETS are N-channel power devices.

5. An "H" switch circuit for providing bidirectional control to a DC motor comprising:

a first SCR having first anode and cathode terminals and a gate terminal, said first anode terminal connected to a supply voltage terminal for coupling to a source of supply voltage and said first cathode terminal for coupling to a first input terminal of said DC motor;

a second SCR having second anode and cathode terminals and a gate terminal, said second anode terminal connected to said first anode terminal and said second cathode terminal for coupling to a second input terminal of said DC motor;

a first MOSFET having first drain and source terminals and a gate terminal, said first source terminal for coupling to a common voltage line, said first drain terminal connected to said second cathode terminal, and said gate terminal of said first MOSFET connected to a first control terminal;

a second MOSFET having second source and drain terminals and a gate terminal, said second source terminal connected to said first source terminal, said second drain terminal connected to said first cathode terminal, and said gate terminal of said second MOSFET connected to a second control terminal;

a first diode having anode and cathode terminals, said anode terminal of said first diode connected to first control terminal;

a second diode having anode and cathode terminals, said anode terminal of said second diode connected to said second control terminal;

a third diode having anode and cathode terminals, said cathode terminal of said third diode connected to said cathode terminal of said first diode and to said gate terminal of said first SCR;

a fourth diode having anode and cathode terminals, said cathode terminal of said fourth diode connected to said cathode terminal of said second diode and to said gate terminal of said second SCR;

a first zener diode having anode and cathode terminals, said anode terminal of said first zener diode connected to said anode terminal of said third diode and said cathode terminal of said first zener diode connected to said cathode terminal of said first SCR;

a second zener diode having anode and cathode terminals, said anode terminal of said second zener diode connected to said anode terminal of said fourth diode and said cathode terminal of said second zener diode connected to said cathode terminal of said second SCR;

a first resistor connected from said gate terminal of said first SCR to said common voltage line; and a second resistor connected from said gate terminal of said second SCR to said common voltage line.

6. The circuit of claim 5 wherein said third and fourth diodes are zener diodes.

7. In an SCR and MOSFET "H" switch circuit having:

a first SCR having first anode and cathode terminals and a gate terminal, said first anode terminal connected to a supply voltage terminal for coupling to a source of supply voltage, said first cathode terminal for coupling to a first input terminal of a DC motor and said gate terminal of said first SCR for coupling to a first control terminal;

a second SCR having second anode and cathode terminals and a gate terminal, said second anode terminal connected to said first anode terminal, said second cathode terminal for coupling to a second input terminal of said DC motor and said gate terminal of said second SCR for coupling to a second control terminal;

a first MOSFET having first drain and source terminals and a gate terminal, said first source terminal for coupling to a common voltage line, said first drain terminal connected to said second cathode terminal, and said gate terminal of said first MOSFET connected to said first control terminal; and a second MOSFET having second source and drain terminal and a gate terminal, said second source terminal connected to said first source terminal, said second drain terminal connected to said first cathode terminal, and said gate terminal of said second MOSFET connected to said second control terminal, the improvement comprising:

first gate clamp means coupled to said first control terminal, to said cathode terminal of said first SCR, to said gate terminal of said first SCR and to said common voltage line for restricting the voltage from said cathode terminal of said first SCR to said gate terminal of said first SCR to a predetermined level; and second gate clamp means coupled to said second control terminal, to said cathode terminal of said second SCR, to said gate terminal of said second SCR and to said common voltage line for restricting the voltage from said cathode terminal of said second SCR to said gate terminal of said second SCR to a predetermined level.

8. The circuit of claim 7 wherein said first gate clamp means comprises:
   a first diode coupled from said first control terminal to said gate terminal of said first SCR;
   series connected second diode and first zener diode coupled from said gate terminal of said first SCR to said first cathode terminal; and
   a first resistor coupled from said gate terminal of said first SCR to said common voltage line;
   and said second gate clamp means comprises:
   a third diode coupled from said second control terminal to said gate terminal of second SCR;
   a series connected fourth diode and second zener diode coupled from said gate terminal of said second SCR to said second cathode terminal; and
   a second resistor coupled from said gate terminal of said second SCR to said common voltage line.

* * * * *